United States Patent
Morariu et al.

(10) Patent No.: US 10,160,355 B2
(45) Date of Patent: Dec. 25, 2018

(54) VEHICLE SEAT VENTILATION SYSTEM AND CONTROL

(71) Applicants: Mihai Morariu, Warren, MI (US); Senrun Geng, Farmington Hills, MI (US)

(72) Inventors: Mihai Morariu, Warren, MI (US); Senrun Geng, Farmington Hills, MI (US)

(73) Assignee: FCA US LLC, Auburn Hills, MI (US)

(*) Notice: Subject to any disclaimer, the term of this patent is extended or adjusted under 35 U.S.C. 154(b) by 171 days.

(21) Appl. No.: 15/236,730

(22) Filed: Aug. 15, 2016

(65) Prior Publication Data

US 2018/0043806 A1 Feb. 15, 2018

(51) Int. Cl.
*A47C 7/72* (2006.01)
*B60N 2/56* (2006.01)

(52) U.S. Cl.
CPC ......... *B60N 2/5657* (2013.01); *B60N 2/5635* (2013.01); *B60N 2/5678* (2013.01)

(58) Field of Classification Search
CPC ...... B60N 2/56; B60N 2/5607; B60N 2/5678; B60N 2/5685; B60N 2/5657; B60N 2/5628; B60N 2/0244; B60N 2002/0268; B60H 1/00285; B60H 2001/003; Y10S 454/907
USPC ...................... 297/180.14, 180.1; 265/42, 43
See application file for complete search history.

(56) References Cited

U.S. PATENT DOCUMENTS

| | | | |
|---|---|---|---|
| 5,002,336 A | 3/1991 | Feher | |
| 5,524,439 A * | 6/1996 | Gallup | A47C 7/74 62/261 |
| 5,626,021 A * | 5/1997 | Karunasiri | A47C 7/74 236/49.3 |
| 5,894,207 A * | 4/1999 | Goings | B60N 2/002 318/478 |
| 5,921,100 A * | 7/1999 | Yoshinori | B60H 1/00285 165/43 |
| 6,059,018 A * | 5/2000 | Yoshinori | B60H 1/00285 165/41 |
| 6,079,485 A * | 6/2000 | Esaki | B60H 1/00285 165/42 |
| 6,105,667 A * | 8/2000 | Yoshinori | B60H 1/00285 165/202 |
| 6,273,810 B1 * | 8/2001 | Rhodes, Jr. | A47C 4/54 454/120 |
| 6,381,406 B1 | 4/2002 | Smith et al. | |

(Continued)

*Primary Examiner* — Chi Q Nguyen
(74) *Attorney, Agent, or Firm* — Ralph E Smith

(57) ABSTRACT

A ventilation system includes a seat bottom blower unit configured to selectively draw an airflow into a seat bottom of the vehicle seat, a seat back blower unit configured to selectively draw an airflow into a seat back of the vehicle seat, and a controller in signal communication with the seat bottom blower unit and the seat back blower unit, the controller configured to generate a common pulse width modulation (PWM) duty cycle signal. The seat bottom blower unit is configured to operate at a first predetermined blower speed based on the common duty cycle signal, and the seat back blower unit is configured to operate at a second different predetermined speed based on the common duty cycle signal. The seat bottom blower unit and the seat back blower units are configured to simultaneously operate at different speeds based on the common duty cycle signal.

18 Claims, 3 Drawing Sheets

(56) References Cited

U.S. PATENT DOCUMENTS

| | | | |
|---|---|---|---|
| 6,541,737 B1* | 4/2003 | Eksin | B60H 1/00792 |
| | | | 219/217 |
| 6,619,736 B2 | 9/2003 | Pietsch et al. | |
| 6,857,697 B2 | 2/2005 | Brennan et al. | |
| 6,928,829 B2 | 8/2005 | Kamiya et al. | |
| 7,229,129 B2 | 6/2007 | White et al. | |
| 7,261,372 B2 | 8/2007 | Aoki | |
| 7,477,969 B2* | 1/2009 | Panic | B60N 2/0244 |
| | | | 219/217 |
| 7,567,045 B2 | 7/2009 | Fristedt | |
| 7,832,214 B2 | 11/2010 | Ito et al. | |
| 8,393,162 B2 | 3/2013 | Chung | |
| 2001/0004008 A1* | 6/2001 | Aoki | B60H 1/00285 |
| | | | 165/43 |
| 2005/0085968 A1* | 4/2005 | Panic | B60N 2/0244 |
| | | | 701/36 |
| 2007/0095378 A1* | 5/2007 | Ito | B60N 2/5657 |
| | | | 136/203 |
| 2008/0036403 A1 | 2/2008 | Ma et al. | |

* cited by examiner

| STATE # | BLOWER STATE | | % DUTY CYCLE | BLOWER RPM | |
|---|---|---|---|---|---|
| | CUSHION | BACK | | CUSHION | BACK |
| S1 | OFF | OFF | <10 OR >90 | 0 | 0 |
| S2 | OFF | LO | 15 | 0 | 2500 |
| S3 | OFF | MED | 20 | 0 | 3500 |
| S4 | OFF | HI | 25 | 0 | 4500 |
| S5 | LO | OFF | 30 | 2500 | 0 |
| S6 | LO | LO | 35 | 2500 | 2500 |
| S7 | LO | MED | 40 | 2500 | 3500 |
| S8 | LO | HI | 45 | 2500 | 4500 |
| S9 | MED | OFF | 50 | 3500 | 0 |
| S10 | MED | LO | 55 | 3500 | 2500 |
| S11 | MED | MED | 60 | 3500 | 3500 |
| S12 | MED | HI | 65 | 3500 | 4500 |
| S13 | HI | OFF | 70 | 4500 | 0 |
| S14 | HI | LO | 75 | 4500 | 2500 |
| S15 | HI | MED | 80 | 4500 | 3500 |
| S16 | HI | HI | 85 | 4500 | 4500 |

VEHICLE SEAT VENTILATION SYSTEM AND CONTROL

FIELD

The present application relates generally to ventilated vehicle seats and, more particularly, to independent blower control of ventilated vehicle seats utilizing a common control arrangement.

BACKGROUND

In order to improve the comfort of vehicle passengers, vehicle seats may be equipped with temperature control systems designed to provide heating or cooling to the vehicle seat, for example, via thermoelectric devices. However, temperature control for multiple areas of the seat requires multiple controllers and actuation buttons, as well as complex wiring, including separate control lines for each blower motor utilized, which adds cost and complexity to the vehicle. Thus, while such systems work for their intended purpose, there remains a need for improvement in the relevant art.

SUMMARY

In one exemplary aspect of the invention, a ventilation system for a vehicle seat is provided. The ventilation system includes a seat bottom blower unit configured to selectively draw an airflow into a seat bottom of the vehicle seat, a seat back blower unit configured to selectively draw an airflow into a seat back of the vehicle seat, and a controller in signal communication with the seat bottom blower unit and the seat back blower unit, the controller configured to generate a common pulse width modulation (PWM) duty cycle signal. The seat bottom blower unit is configured to operate at a first predetermined blower speed based on the common duty cycle signal, and the seat back blower unit is configured to operate at a second predetermined speed based on the common duty cycle signal. The seat bottom blower unit and the seat back blower units are configured to simultaneously operate at different speeds.

In another exemplary aspect of the invention, a vehicle seat is provided. The vehicle seat includes a seat bottom having a first plurality of air passages, a seat back having a second plurality of air passages, and a seat ventilation system. The seat ventilation system includes a seat bottom blower unit configured to selectively draw a first airflow through the first plurality of air passages, a seat back blower unit configured to selectively draw a second airflow through the second plurality of air passages, and a controller in signal communication with the seat bottom blower unit and the seat back blower unit, the controller configured to generate a common pulse width modulation (PWM) duty cycle signal based on a seat bottom ventilation setting input signal and a seat back ventilation setting input signal. The seat bottom blower unit is configured to operate at a first predetermined blower speed based on the common duty cycle signal, and the seat back blower unit is configured to operate at a second predetermined speed based on the common duty cycle signal. The seat bottom blower unit and the seat back blower units are configured to simultaneously operate at different speeds.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
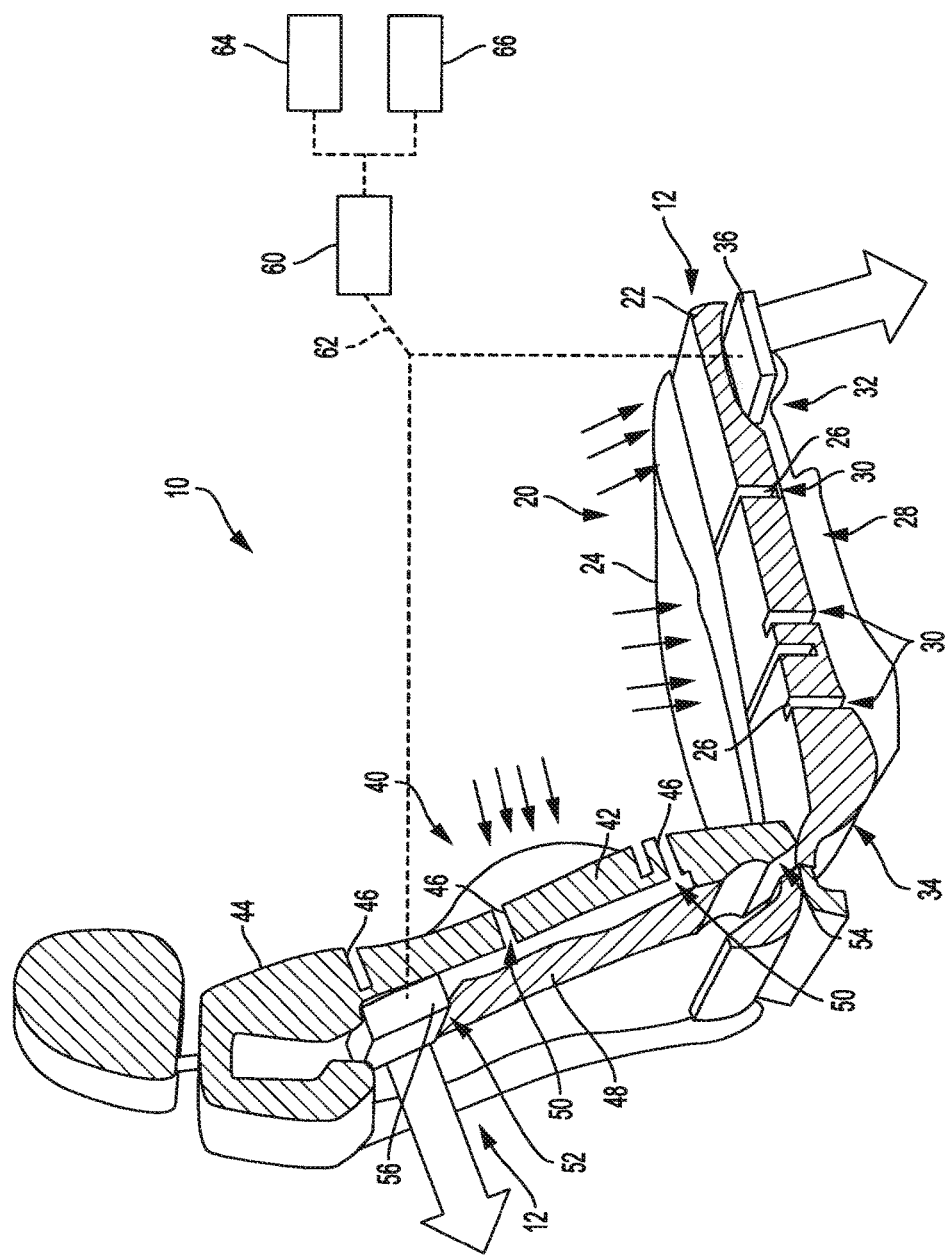
FIG. 1 is a sectional view of a vehicle seat having an example seat ventilation system in accordance with the principles of the present disclosure.

With initial reference to FIG. 1, an example vehicle seat is illustrated and generally identified at reference numeral 10. The vehicle seat 10 includes a seat ventilation system 12 configured to simultaneously control two or more separate seat ventilation fans or blowers at different speeds with a single controller, thereby preventing the need for additional wiring or mechanical devices. More specifically, each blower is programmed with a different RPM curve, and each blower motor speed is subsequently controlled by modulating input pulse width. Accordingly, this enables various input range states that each correspond to a split functionality of temperature control levels for the seat while utilizing a common signal. For example, a pulse width modulation (PWM) duty ratio signal of 55% may correspond to a "medium" ventilation setting in a seat bottom blower and a "low" ventilation setting in a seat back blower. In this way, the multiple seat blowers can be controlled using a single controller and common control line, without any structural change to the electrical architecture or control module of existing systems.

As illustrated in FIG. 1, the vehicle seat 10 generally includes a seat bottom 20 coupled to a seat back 40. The seat bottom 20 includes a foam core or cushion 22 covered by an air-permeable seat cover 24. For example, air-permeable seat cover 24 may include a plurality of openings (not shown) to enable air to flow therethrough. A plurality of air passages 26 extend through cushion 22 and are fluidly connected to an air manifold 28 having inlets 30 and an outlet 32. Air drawn through air passages 26 and manifold inlets 30 is subsequently supplied to manifold outlet 32.

A seat base member 34 provides support to cushion 22 and is part of an overall seat base assembly that includes several components or members providing structural seat support. Seat base member 34 may include components configured to be coupled to a vehicle floor (not shown) to thereby secure vehicle seat 10 within the vehicle. In one example, a seat bottom blower unit 36 is fixedly coupled to the seat base member 34. However, it will be appreciated that blower unit 36 may be secured to various other components and arranged in various other locations in the vehicle seat 10 or the vehicle.

Blower unit 36 is fluidly coupled to the air manifold outlet 32 and is configured to generate an airflow from the vehicle cabin, into air passages 26, and subsequently to air manifold inlets 30. The air is then drawn through manifold outlet 32 and supplied back into the vehicle cabin. As such, blower unit 36 is configured to draw cabin air around a leg area of an occupant seated in vehicle seat 10 to provide cooling thereto.

The seat back 40 includes a foam core or cushion 42 covered by an air-permeable seat cover 44. For example, air-permeable seat cover 44 may include a plurality of openings (not shown) to enable air to flow therethrough. A plurality of air passages 46 extend through cushion 42 and are fluidly connected to an air manifold 48 having inlets 50 and an outlet 52. Air drawn through air passages 46 and manifold inlet 50 is subsequently supplied to manifold outlet 52.

A seat back member 54 provides support to cushion 42 and is part of an overall seat back assembly that includes several components or members providing structural back support. Seat back member 54 may include components configured to be coupled to the seat base member 34 to thereby form the assembled vehicle seat 10 within the vehicle. In one example, a seat back blower unit 56 is fixedly coupled to the seat back member 54. However, it will be appreciated that blower unit 56 may be secured to various other components and arranged in various other locations in the vehicle seat 10 or the vehicle.

Blower unit 56 is fluidly coupled to the air manifold outlet 52 and is configured to generate an airflow from the vehicle cabin, into air passages 46, and subsequently to air manifold inlets 50. The air is then drawn through manifold outlet 52 and supplied back into the vehicle cabin. As such, blower unit 56 is configured to draw cabin air around a back or torso area of an occupant seated in vehicle seat 10 to provide cooling thereto.

In the example embodiment, the seat ventilation system 12 generally includes a controller 60 in signal communication in parallel with blower units 36 and 56 via a common control line 62. In one example, controller 60 is a programmable seat heat and vent module. However, as used herein, the term controller refers to an electronic control system, control module and/or an application specific integrated circuit (ASIC), an electronic circuit, a processor (shared, dedicated, or group) and memory that executes one or more software or firmware programs, a combinational logic circuit, and/or other suitable components that provide the described functionality.

A seat bottom ventilation setting input device 64 is in signal communication with controller 60 and is configured to generate a signal indicating a desired operational setting for blower unit 36, for example, as chosen by the seat occupant or a vehicle system. A seat back ventilation setting input device 66 is in signal communication with controller 60 and is configured to generate a signal indicating a desired operational setting for blower unit 56, for example, as chosen by the seat occupant or a vehicle system, as described herein in more detail. Input devices 64, 66 may be, for example, a button on an instrument panel of the vehicle or a soft key on an infotainment system display (not shown).

Controller 60 is configured to independently control the motor speed of each blower unit 36, 56 by a pulse width modulation (PWM). In this way, only a single controller 60 is required, thus preventing the need for a separate controller or additional wiring for each blower unit 36, 56. Moreover, unlike known systems that can only operate multiple blowers at the same speed, seat bottom blower unit 36 and seat back blower unit 56 are programmed to interpret and react to the input signal differently. In this way, blower units 36, 56 may be simultaneously operated at different speeds utilizing a common signal, thereby providing increased thermal conditioning options for the seat occupant, as described herein in more detail. Accordingly, two or more blower units utilize the common control line and can be operated at different speeds throughout a full range of pulse width modulation input (0% to 100% PWM duty cycle).

Figure 2:
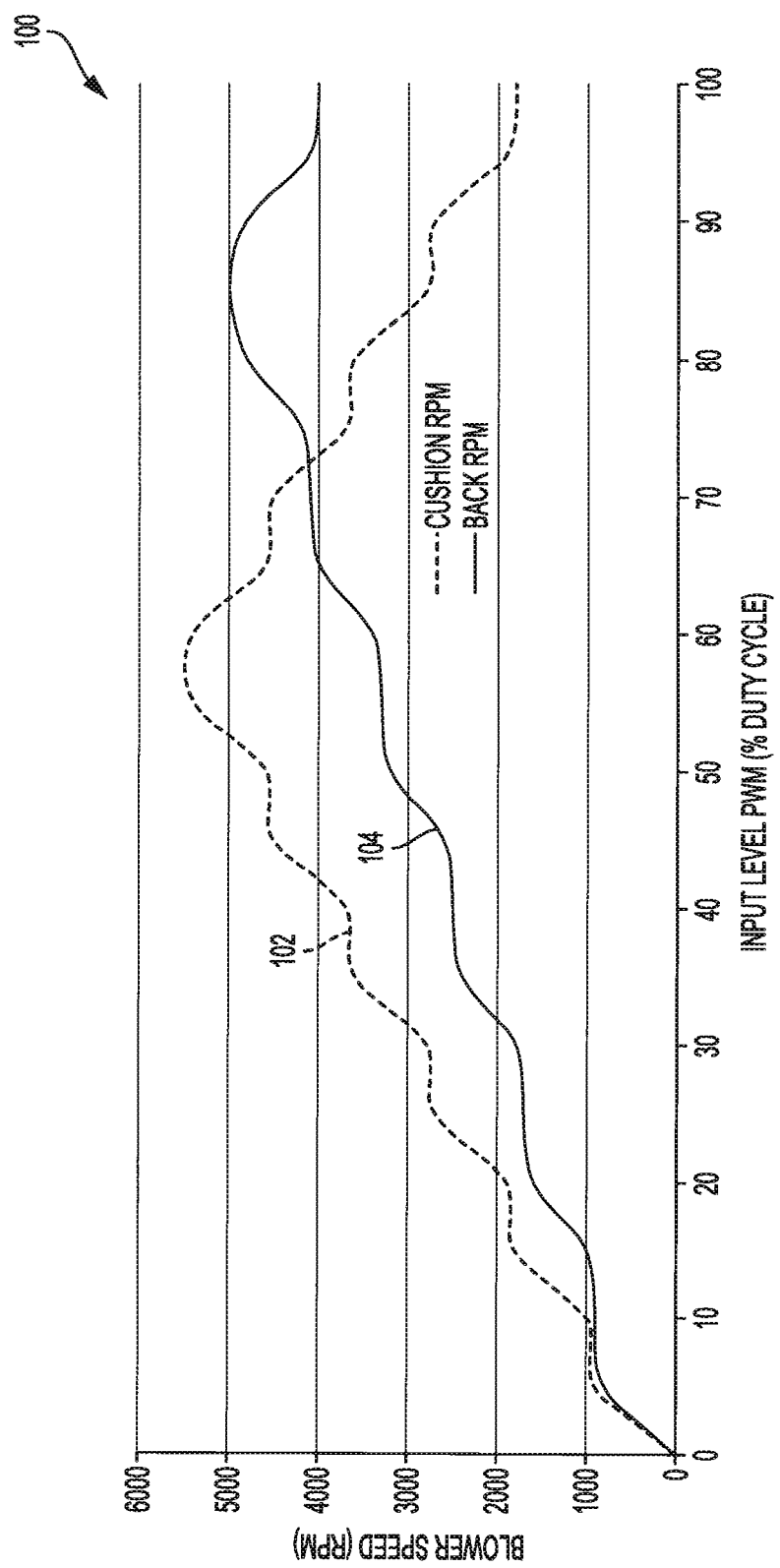
FIG. 2 is a graph illustrating example blower fan speeds for a given pulse width modulation duty cycle in accordance with the principles of the present disclosure.
Figures 3, 4:
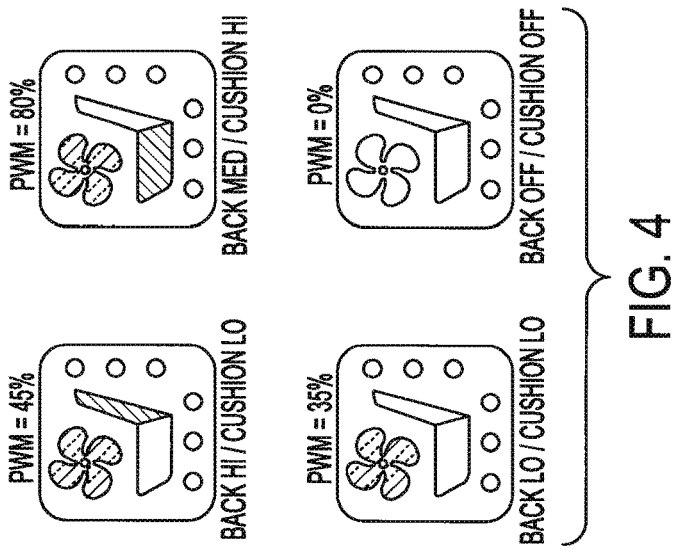
FIG. 3 is a table illustrating various example states of the seat ventilation system shown in FIG. 1 in accordance with the principles of the present disclosure.
FIG. 4 is a graphical illustration of some example states shown in FIG. 3 in accordance with the principles of the present disclosure.

With additional reference to FIGS. 2-4, controller 60 is configured to vary the input level PWM as a percent (%) duty cycle based on a seat occupant input to seat bottom ventilation setting input device 64 and seat back ventilation setting input device 66. For example, the input may be sent via one or more buttons on a vehicle instrument panel or one or more soft keys on an infotainment unit display (not shown).

With reference to FIGS. 3 and 4, in one example, seat bottom input device 64 includes "off", "low", "medium", and "high" blower speed settings associated with blower unit 36. Such settings are configured to generate a corresponding airflow around the seat occupant via air passages 26. Similarly, seat back input device 66 includes "off", "low", "medium", and "high" blower speed settings associated with blower unit 56. Such settings are configured to generate a corresponding airflow around the seat occupant via air passages 46. However, it will be appreciated that blower units 36, 56 may have any desired number of blower speed settings.

In one example, the "off" blower speed setting corresponds approximately to 0 RPM blower speed, the "low" blower speed setting corresponds to between approximately 2,000 RPM and approximately 3,500 RPM blower speed, the "medium" blower speed setting corresponds to between approximately 3,500 RPM and approximately 5,000 RPM blower speed, and the "high" blower speed setting corresponds to between approximately 5,000 RPM and approximately 6,500 RPM blower speed.

In another aspect, the "off" blower speed setting corresponds to 0 RPM blower speed, the "low" blower speed setting corresponds to between 2,000 RPM and 3,500 RPM blower speed, the "medium" blower speed selling corresponds to between 3,500 RPM and 5,000 RPM blower speed, and the "high" blower speed setting corresponds to between 5,000 RPM and 6,500 RPM blower speed.

In the example implementation, each PWM input level between 0% duty cycle and 100% duty cycle corresponds to a specific blower speed, which corresponds to a specific blower speed setting chosen via setting input devices 64, 66. As such, controller 60 receives input signals from devices 64, 66 and generates a % duty cycle signal. Each blower 36, 56 reacts differently and independently to the % duty cycle signal, thereby allowing separate speed control of blowers 36, 56 with a single controller 60. For example, FIG. 2 illustrates a graph 100 showing blower curves representing input level PWM (% duty cycle) and a corresponding blower speed in RPM. Line 102 represents the speed of seat bottom blower unit 36 for a given % duty cycle signal, and line 104 represents the speed of seat back blower unit 56 for a given % duty cycle signal.

FIG. 3 shows a graphical illustration of example seat ventilation states as they correspond to input PWM % duty cycle. Each state represents a specific "off", "low", "med", or "high" setting for each of the seat bottom blower unit 36 and the seat back blower unit 56. As such, seat ventilation system 12 is configured for sixteen different combinations or states of operation between the four settings for each of the two blower units 36, 56. For example, State1 corresponds to an "off" setting for seat bottom blower unit 36 and an "off" setting for seat back blower unit 56. As such, when the setting input devices 64, 66 indicate a desire for State1, controller 60 provides a % duty cycle signal less than 10% or greater than 90% to blower units 36, 56, which directs the programmed blower units 36, 56 to operate at 0 RPM blower speed.

In another example, State 12 corresponds to a "medium" setting for seat bottom blower unit 36 and a "high" setting for seat back blower unit 56. As such, when the setting input devices 64, 66 indicate a desire for State12, controller 60 provides a 65% duty cycle signal, which directs the programmed blower units 36, 56 to respectively operate at 3,500 RPM and 4,500 RPM blower speeds. As such, single controller 60 is operable to individually control the blower speed of blower units 36, 56 while only using a single PWM signal.

Described herein are systems and methods for simultaneously controlling the individual speeds of multiple seat ventilation blower units with a single controller. A seat bottom blower unit and a seat back blower unit and coupled in parallel to a single controller. The controller is configured to provide PWM % duty cycle signals to the blower units based on a user or vehicle input. Each % duty cycle signal corresponds to a specific blower speed for each of the individual blower units. Accordingly, two or more blower units may be controlled at different speeds utilizing a single controller without additional structural/electrical complexity, thereby reducing complexity, cost, and number of parts.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A ventilation system for a vehicle seat, the ventilation system comprising:
   a seat bottom blower unit configured to selectively draw airflow into a seat bottom of the vehicle seat;
   a seat back blower unit configured to selectively draw airflow into a seat back of the vehicle seat; and
   a controller in signal communication with the seat bottom blower unit and the seat back blower unit via a common control line, the controller configured to generate a common pulse width modulation (PWM) duty cycle signal
   configured to independently control both the seat bottom blower unit and the seat back blower unit such that the seat back and seat bottom blower units are configured to selectively operate at different predetermined speeds based on the common duty cycle signal received via the common control line.

2. The ventilation system of claim 1, wherein the controller is a single controller, wherein the seat bottom blower unit and the seat back blower unit are connected in parallel to the single controller by the common control line, and wherein the generated PWM duty cycle signal is configured to independently control both the seat bottom blower unit and the seat back blower unit such that the seat back and seat bottom blower units are configured to simultaneously operate at different predetermined speeds based on the common duty cycle signal received via the common control line.

3. The ventilation system of claim 2, wherein the wherein the seat bottom blower unit and the seat back blower unit are separate blower units spaced apart from each other and positioned in seat back and the seat bottom, respectively.

4. The ventilation system of claim 1, wherein the common PWM duty cycle signal is generated based on a seat bottom ventilation setting input signal and a seat back ventilation setting input signal.

5. The ventilation system of claim 1, wherein the seat bottom blower unit includes an off setting, a low setting, a medium setting, and a high setting each corresponding to a different speed of the seat bottom blower unit.

6. The ventilation system of claim 5, wherein the seat back blower unit includes an off setting, a low setting, a medium setting, and a high setting each corresponding to a different speed of the seat back blower unit.

7. The ventilation system of claim 5, wherein each off setting corresponds to approximately 0 RPM blower speed, each low setting corresponds to between approximately 2,000 RPM and approximately 3,500 RPM blower speed, each medium setting corresponds to between approximately 3,500 RPM and approximately 5,000 RPM blower speed, and each high setting corresponds to between approximately 5,000 RPM and approximately 6,500 RPM blower speed.

8. The ventilation system of claim 1, wherein the common PWM duty cycle signal is between 0% and 100%.

9. The ventilation system of claim 8, wherein the common PWM duty cycle signal is configured to generate sixteen unique control states with the seat bottom blower unit and the seat back blower unit.

10. A vehicle seat comprising:
    a seat bottom having a first plurality of air passages;
    a seat back having a second plurality of air passages; and
    a seat ventilation system comprising:
      a seat bottom blower unit configured to selectively draw a first airflow through the first plurality of air passages;
      a seat back blower unit configured to selectively draw a second airflow through the second plurality of air passages; and
      a controller in signal communication with the seat bottom blower unit and the seat back blower unit, the controller configured to generate a common pulse width modulation (PWM) duty cycle signal based on a seat bottom ventilation setting input signal and a seat back ventilation setting input signal,
      wherein the seat bottom blower unit is configured to operate at a first predetermined blower speed based on the common duty cycle signal, and the seat back blower unit is configured to operate at a second different predetermined speed based on the common duty cycle signal,
      wherein the seat bottom blower unit and the seat back blower unit are configured to simultaneously operate at different speeds based on the common duty cycle signal.

11. The vehicle seat of claim 10, further comprising a first air manifold coupled between the seat bottom blower unit and the first plurality of air passages.

12. The vehicle seat of claim 11, further comprising a second air manifold coupled between the seat back blower unit and the second plurality of air passages.

13. The vehicle seat of claim 10, wherein the controller is a single controller, and wherein the seat bottom blower unit and the seat back blower unit are connected in parallel to the controller by a common control line.

14. The vehicle seat of claim 13, wherein the wherein the seat bottom blower unit and the seat back blower unit are separate blower units spaced apart from each other and positioned in seat back and the seat bottom, respectively.

15. The vehicle seat of claim 10, wherein the common PWM duty cycle signal is generated based on a seat bottom ventilation setting input signal and a seat back ventilation setting input signal.

16. The vehicle seat of claim 10, wherein the seat bottom blower unit includes an off setting, a low setting, a medium setting, and a high setting each corresponding to a different speed of the seat bottom blower unit.

17. The vehicle seat of claim 16, wherein the seat back blower unit includes an off setting, a low setting, a medium setting, and a high setting each corresponding to a different speed of the seat back blower unit.

18. The vehicle seat of claim 10, wherein the common PWM duty cycle signal is configured to generate sixteen unique control states with the seat bottom blower unit and the seat back blower unit.

* * * * *